(12) United States Patent
Aono et al.

(10) Patent No.: US 8,674,578 B2
(45) Date of Patent: Mar. 18, 2014

(54) STATOR, BUS BAR UNIT AND MOTOR

(75) Inventors: Masato Aono, Kyoto (JP); Keisuke Fukunaga, Kyoto (JP); Motofumi Otsuji, Kyoto (JP)

(73) Assignee: Nidec Corporation, Kyoto (JP)

( * ) Notice: Subject to any disclaimer, the term of this patent is extended or adjusted under 35 U.S.C. 154(b) by 322 days.

(21) Appl. No.: 13/202,631

(22) PCT Filed: Feb. 23, 2010

(86) PCT No.: PCT/JP2010/052756
§ 371 (c)(1),
(2), (4) Date: Aug. 22, 2011

(87) PCT Pub. No.: WO2010/095752
PCT Pub. Date: Aug. 26, 2010

(65) Prior Publication Data
US 2011/0297474 A1    Dec. 8, 2011

(30) Foreign Application Priority Data
Feb. 23, 2009   (JP) .................................. 2009-039159

(51) Int. Cl.
*H02G 5/00* (2006.01)
*H02K 5/00* (2006.01)
*H02K 3/28* (2006.01)

(52) U.S. Cl.
USPC ............................. 310/208; 174/68.2; 310/71

(58) Field of Classification Search
USPC ...................... 310/71, 90, 168, 208
See application file for complete search history.

(56) References Cited

U.S. PATENT DOCUMENTS

| 7,893,587 B2 * | 2/2011 | Comte | 310/179 |
| 2006/0022544 A1 | 2/2006 | Kinashi | |
| 2008/0283331 A1 * | 11/2008 | Higashi et al. | 180/444 |

FOREIGN PATENT DOCUMENTS

| JP | 09-191588 A | 7/1997 |
| JP | 2000-261990 A | 9/2000 |
| JP | 2006-050690 A | 2/2006 |
| JP | 2009-027777 A | 2/2009 |
| WO | 02/052693 A2 | 7/2002 |
| WO | WO 2007144753 A1 * | 12/2007 |

OTHER PUBLICATIONS

English translation of Official Communication issued in corresponding International Application PCT/JP2010/052756, mailed on Sep. 13, 2011.
Official Communication issued in International Patent Application No. PCT/JP2010/052756, mailed on Jun. 1, 2010.

* cited by examiner

*Primary Examiner* — Tony Winner
*Assistant Examiner* — Jacob Knutson
(74) *Attorney, Agent, or Firm* — Keating & Bennett, LLP

(57) ABSTRACT

A stator includes a core and a coil group. The core includes a ring portion, and a teeth portion preferably including twelve teeth portions projecting from an inside of the ring portion toward a center thereof. The coil group preferably includes twelve coils arranged in each of the teeth portions. The core is defined by coupling twelve cores which respectively include a teeth portion. The coil group preferably includes six coil pairs each including two coils joined to each other by a single conductive line. When the core is divided into a phase region and a neutral region equally along the axial direction, a first group of coils in each of the six coil pairs are arranged in the phase region, and the other coils are arranged in the neutral region.

6 Claims, 11 Drawing Sheets

STATOR, BUS BAR UNIT AND MOTOR

BACKGROUND OF THE INVENTION

1. Field of the Invention

The present invention relates to a stator, a bus bar unit, a motor, and a power steering device.

2. Description of the Related Art

A pole number (a rotor's magnetic pole number) or a slot number (which corresponds to the magnetic pole number on the stator's side), which is a basic constitution of a motor, is appropriately decided in accordance with the motor's specifications. Usually, a coil arrangement is designed for each combination of the number of poles or the number of slots.

For example, a fourteen pole, twelve slot brushless motor which generates a rotating magnetic field by a three-phase coil group consisting of a U-phase, a V-phase and a W-phase is well known (see, for example, Japanese Patent Application Publication No. 2006-050690). In the stator of this brushless motor, the coils of each phase are respectively defined by four divided cores. Each divided core is arranged in a ring shape and fixed in order for the coil group of each phase to form a certain arrangement. Further, a conductive line derived from each coil group is generally connected by a bus bar unit provided in the motor.

SUMMARY OF THE INVENTION

Preferred embodiments of the present invention provide a bus bar unit which is arranged to correspond with the specific structural requirements of a stator or of a motor and which also is arranged to possess the smallest and simplest structure possible.

A stator according to a preferred embodiment of the present invention includes a core and a coil group. The core preferably includes a ring portion having a shape of a ring, and a teeth portion preferably including, for example, twelve teeth portions. The coil group preferably includes twelve coils provided with each of the teeth portions. The core is defined by coupling twelve cores each having a teeth portion. The coil group is defined by six pairs of coils each including two coils joined to each other by a single conductive line. When the core is divided into a phase region and a neutral region equally along the axial direction, one of the coils in the six pairs of coils is arranged in the phase region, and the other coils are arranged in the neutral region.

Also, a bus bar unit according to a preferred embodiment of the present invention includes a plurality of bus bars and an insulating holder where the plurality of bus bars is arranged. The holder preferably includes a bus bar supporting portion in the shape of a ring. The bus bar preferably includes a first bus bar approximately in the shape of a semicircle and at least a second bus bar, a third bus bar, and a fourth bus bar in the shape of a minor arc. When the bus bar supporting portion is divided into a phase region and a neutral region equally along an axial direction, the first bus bar is arranged in the neutral region, and at least the second bus bar, the third bus bar, and the fourth bus bar are arranged in the phase region in an overlapping manner.

Accordingly, by using the above described preferred embodiments of the present invention, it is possible to provide a miniaturized motor and to reduce the cost of the materials used to form the motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Set forth below are detailed descriptions of preferred embodiments of the present invention based on the drawings. The descriptions below are substantially examples, and they do not necessarily imply any limitations on the preferred embodiments of the present invention, where it is applied to or how it is used.

Figure 1:
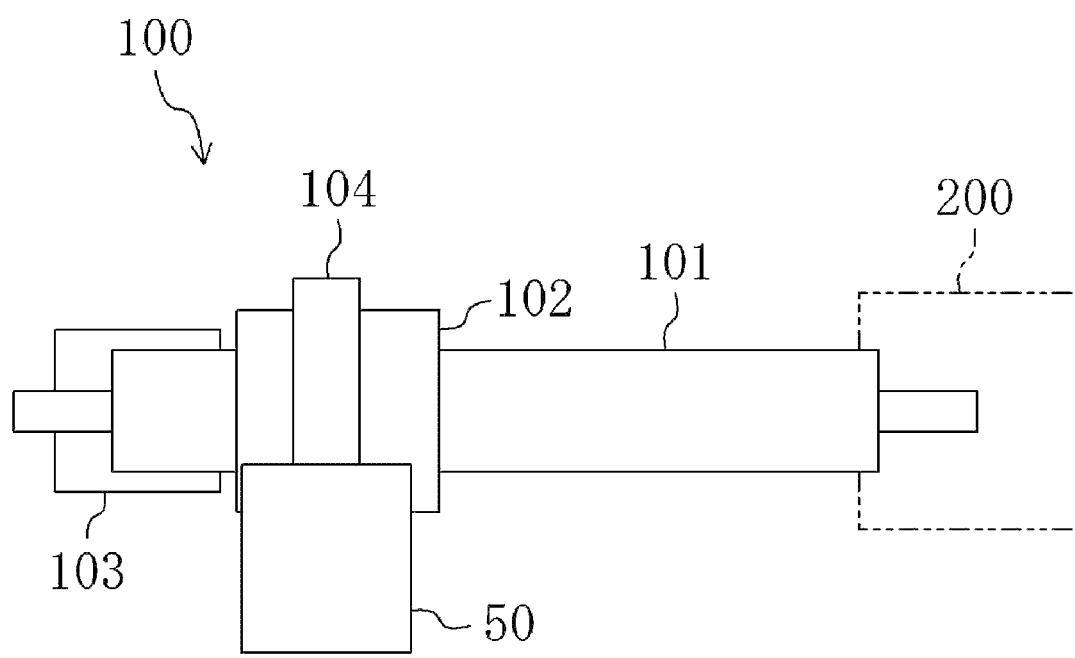
FIG. 1 is a schematic diagram of a power steering device according to a preferred embodiment of the present invention.

FIG. 1 is a schematic diagram of an electrically-powered power steering device 100. The power steering device 100 is preferably arranged to be used in assisting the operation of a steering mechanism (e.g., a steering wheel) in a vehicle such as an automobile, for example. The power steering device 100 preferably includes a torque sensor 102 which is arranged to detect the power applied to the handle through a shaft portion 101 connected to a steering apparatus 200, a control unit 103 which is arranged to calculate the necessary assist power based on an output from the torque sensor 102, a motor 50 which generates a rotative force based on the output from the control unit 103, and a reduction mechanism 104 which reduces the rotative force of the motor 50 and delivers the same to the steering apparatus 200.

In a vehicle including the power steering device 100, the motor 50 of the power steering device 100 is operated by the power applied to the steering apparatus 200, and the rotation of the steering apparatus 200 is assisted by the rotative force of the motor 50, which makes it possible to operate the steering apparatus 200 with a small amount of force.

Figure 2:
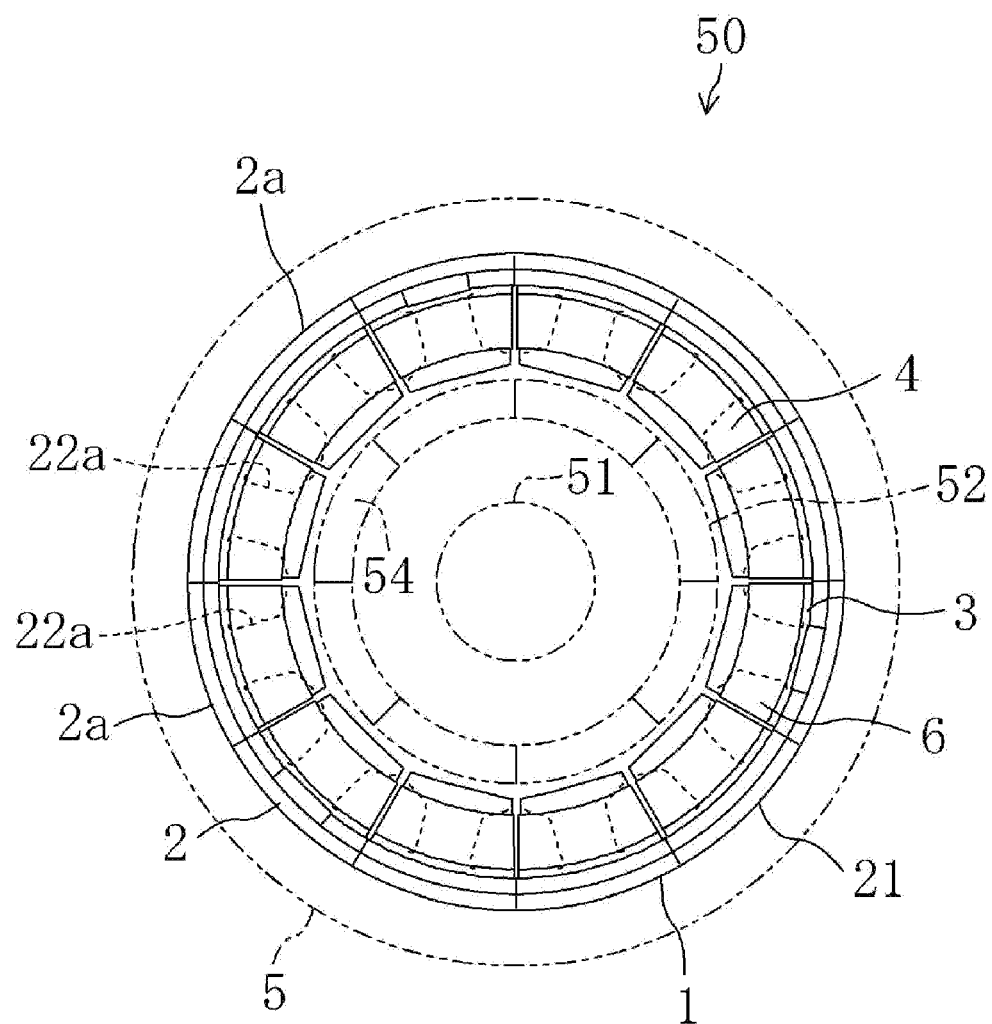
FIG. 2 is a schematic sectional view of a motor structure according to a preferred embodiment of the present invention.

FIG. 2 is a schematic diagram of a section of the motor 50. The motor 50 is preferably a so called inner-rotor type motor configured with, for example, 8 poles and 12 slots. The motor 50 preferably includes a shaft 51, a rotor 52, a stator 1, a bus bar unit 30, and a motor housing 5.

Figure 3:
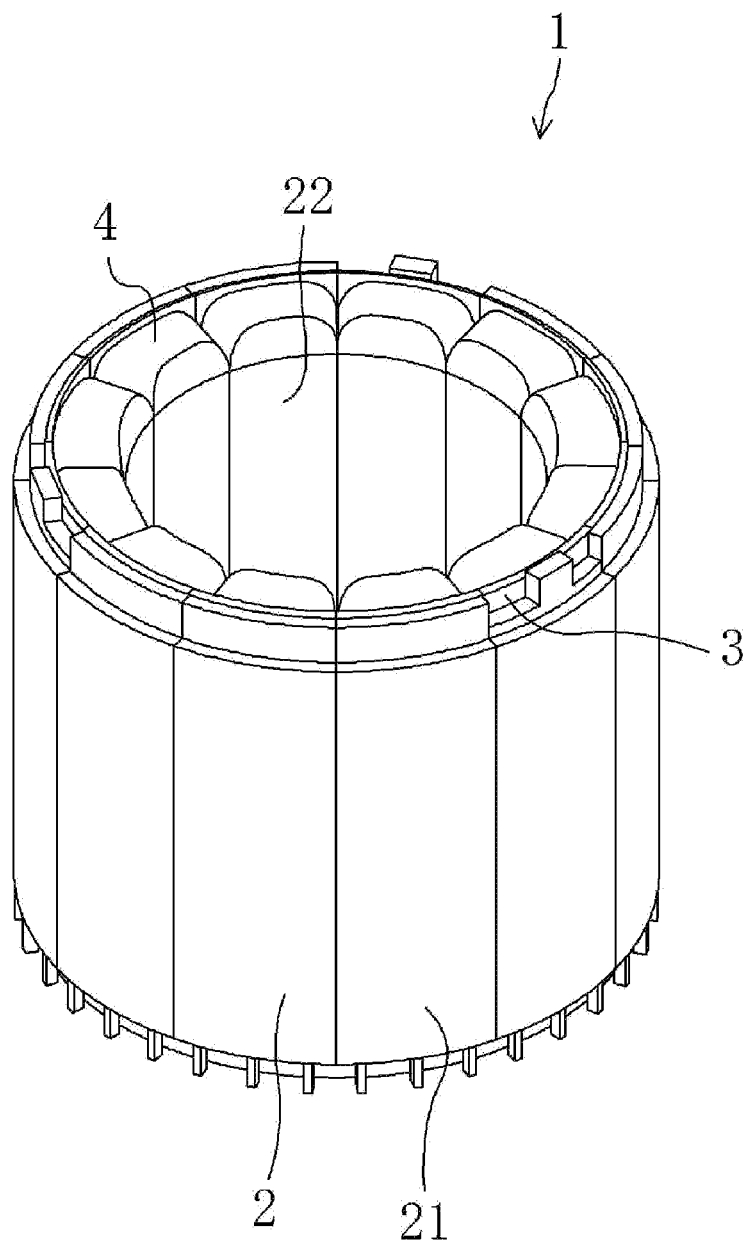
FIG. 3 is a schematic perspective view of a stator according to a preferred embodiment of the present invention.

Specifically, the stator 1 which is approximately in a form of a cylinder is provided in the motor housing 5 as illustrated in FIG. 3. The rotor 52 which is approximately in a form of a cylinder is fixed around the circumference of the shaft 51 which is rotatably supported with respect to the motor housing 5. The outer circumference surface of the rotor 52 and the inner circumference surface of the stator 1 face each other with a slight air gap therebetween. In this preferred embodiment of the present invention, eight magnets 54 (8 poles) are preferably arranged in even intervals around the outer circumference of the rotor 52 such that the N-poles and the S-poles of the eight magnets 54 are alternately arranged.

The stator 1 preferably includes a core 2, an insulator 3, and a coil 4. The core 2 is formed preferably by laminating sheets of steel. The core 2 preferably includes a ring portion 21 in the shape of a ring and a teeth portion 22. The teeth portion 22 of this preferred embodiment of the present invention preferably includes, for example, twelve teeth portions 22a projecting from the inside of the ring portion 21 toward the center thereof. A conductive line is wound around each teeth portion 22a about the insulator 3, and the coil 4 is preferably provided as a "concentrated" winding. That is, a coil group including twelve coils 4 is arranged in the teeth portion 22. Further, a conductive line is accommodated within the twelve spaces (slots) 6 between the adjacent teeth portions 22a (twelve slots).

The core 2 is preferably defined by coupling the twelve cores 2a. Each core 2a is extended to the axial direction and preferably has an external form including an approximately T-shaped section, and each core has a teeth portion 22a (see FIG. 5). A conductive line is preferably arranged to be wound about every two teeth portions 22a to provide six total pairs of coils 40. Specifically, a coil pair 40 connecting two coils 4 is provided by consecutively winding a conductive line to each teeth portion 22a with respect to two unconnected cores 2a.

Figure 4:
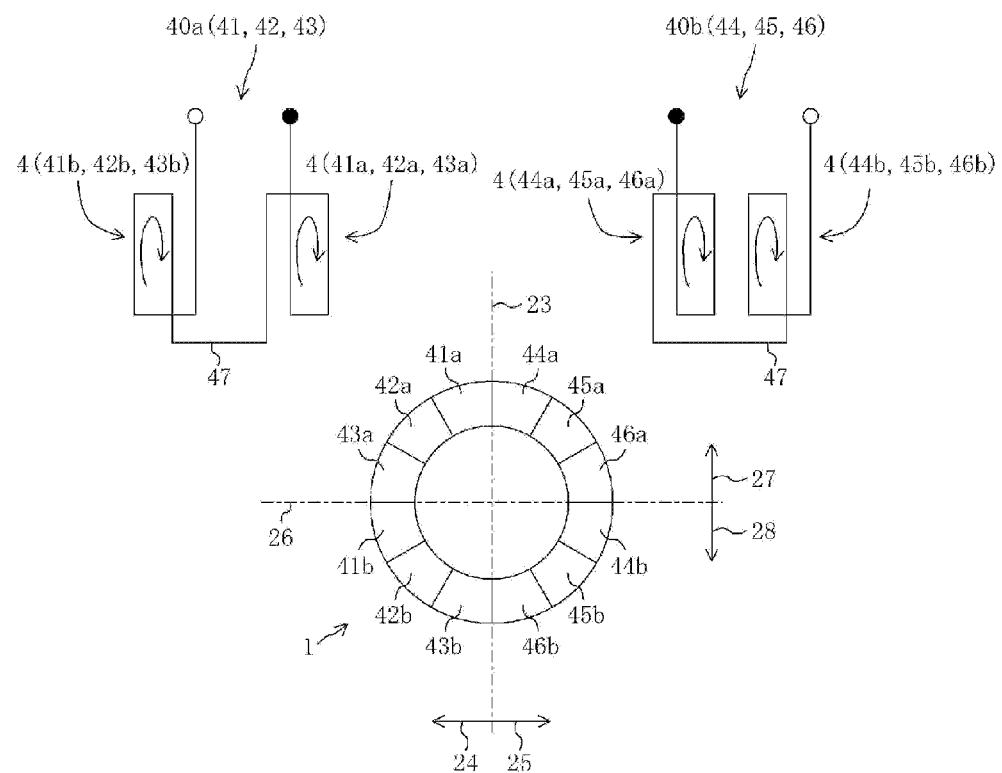
FIG. 4 is a schematic diagram for illustrating a coil arrangement according to a preferred embodiment of the present invention.

As illustrated in FIG. 4, the winding direction of the two coils 4 in each coil pair 40 is arranged in the same direction when viewed from a front end side of the teeth portion 22a. In the present preferred embodiment of the present invention, the winding direction of the two coils 4 in each coil pair 40 is preferably a clockwise direction; however, a counter clockwise direction is also applicable if so desired.

The coil pair 40 preferably includes two types of coil pairs 40a, 40b where the winding directions of conductive line are different. As illustrated in the left side of FIG. 4, for example, the coil pair 40a includes a first coil pair 41, a second coil pair 42, and a third coil pair 43 where the winding of the two coils 4 starts from the left coil 4 and ends at the right coil 4. As also illustrated in the right side of FIG. 4, the coil pair 40b includes a fourth coil pair 44, a fifth coil pair 45, and a sixth coil pair 46 where the winding starts from the right coil 4 and ends at the left coil 4.

Specifically, the winding in the first coil pair 41, the second coil pair 42, and the third coil pair 43 respectively starts from the respective left coils 41b, 42b, 43b and ends at the right coils 41a, 42a, 43a. The winding in the fourth coil pair 44, the fifth coil pair 45, and the sixth coil pair 46 starts from the respective right coils 44b, 45b, 46b and ends at the left coils 44a, 45a, 46a. Further in FIG. 4, the white circle illustrates a starting end of winding, and the black circle illustrates a finishing end of winding.

Figure 5:
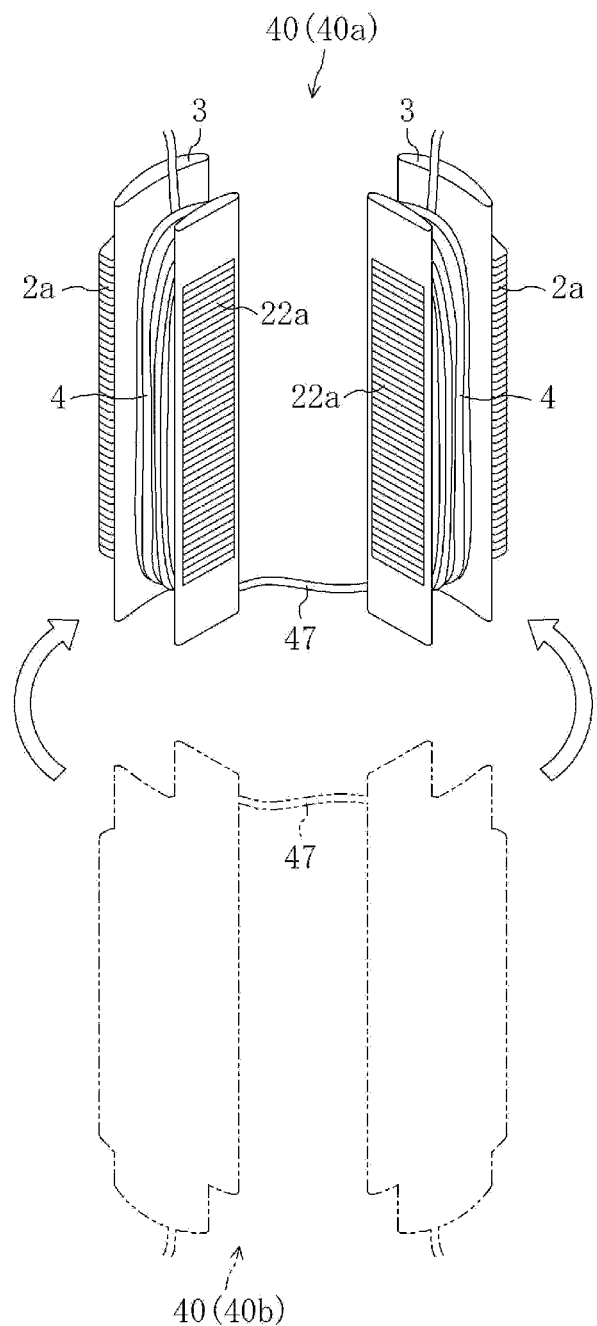
FIG. 5 is a diagram illustrating the coil pair according to a preferred embodiment of the present invention.

The two types of coil pairs 40a, 40b where the winding directions of the conductive line are different can be easily produced, for example, by using the method illustrated in FIG. 5. That is, one coil pair 40a or 40b can be formed by bending the coil pair 40 wound in the same direction as the other coil pair 40b or 40a in an opposite direction at a portion of its jumper wire 47 and then changing the left and right of each core 2a. Thus, it is desirable to form one coil pair 40a or 40b first, and then form the other coil pair 40b or 40a by bending the necessary portion of the coil pair 40a or 40b for connecting each core 2a, which provides excellent work efficiency. Each coil pair 40 is installed in a predetermined arrangement so that the motor efficiency is performed suitably for the power steering device 100.

As illustrated in FIG. 4, for example, when the core 2 is viewed in its axial direction and virtually divided by a first compartment line 23 into a first region 24 and a second region 25, the first coil pair to the third coil pair 41-43 are arranged in the first region 24, and the fourth coil pair to the sixth coil pair 44-46 are arranged in the second region 25.

Also, for example, the coil 42a of the second coil pair 42 and the coil 43a of the third coil pair 43 are arranged to be placed between the two coils 41a, 41b of the first coil pair 41. That is, in the first region 24 or the second region 25, coils 4 respectively from another two coil pairs 40 are arranged between the two coils 4 of one coil pair 40.

Further, the winding direction of each coil pair 40 is arranged in a symmetrical form with respect to the first compartment line 23 in the first region 24 and the second region 25.

Specifically, in the first region 24, the coil 41a, the coil 42a, the coil 43a, the coil 41b, the coil 42b, the coil 43b are arranged in a counter clockwise direction in this order, for example. In the second region 25, the coil 44a, the coil 45a, the coil 46a, the coil 44b, the coil 45b, the coil 46b are arranged in a clockwise direction in this order, for example.

Figure 6:
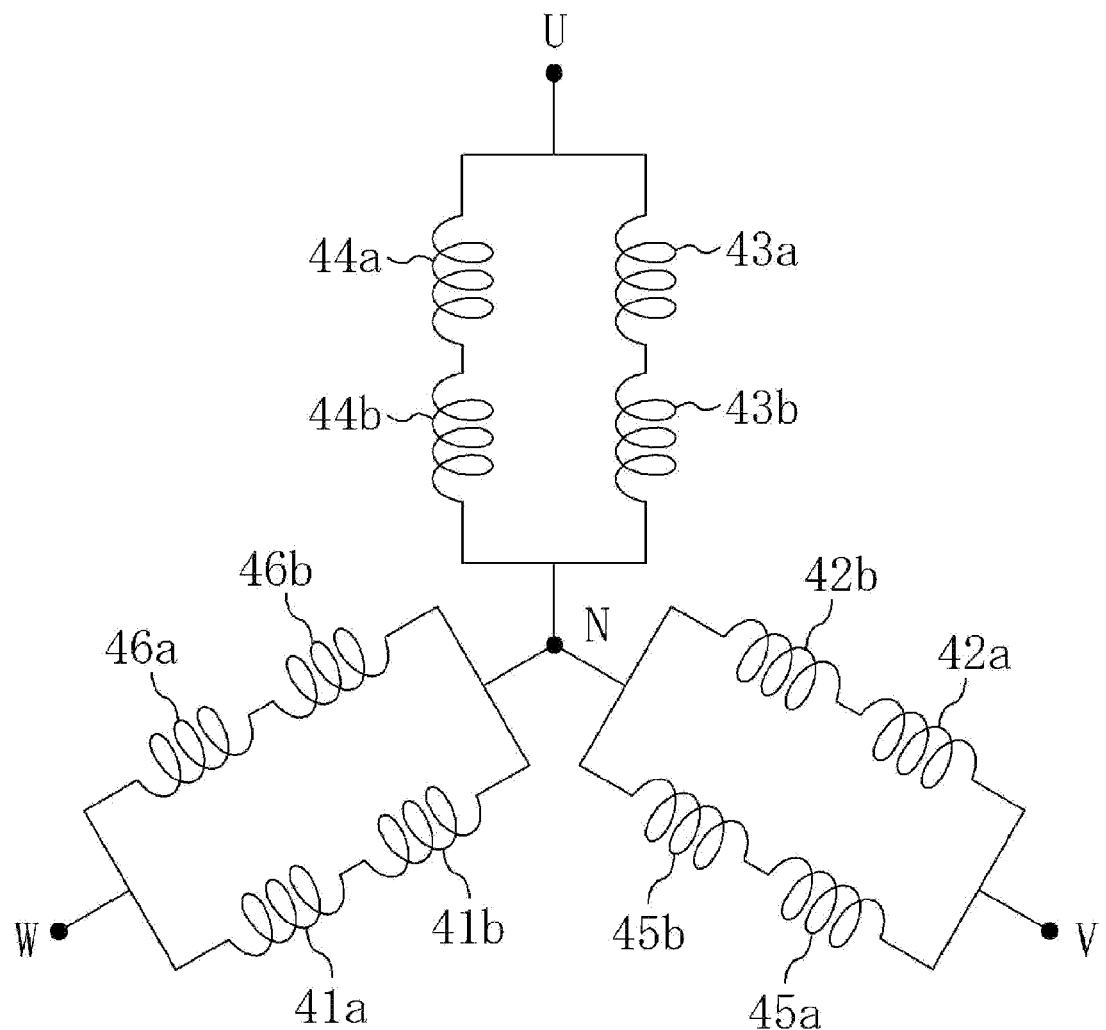
FIG. 6 is a wiring diagram of a stator according to a preferred embodiment of the present invention.

Such arrangement makes it possible to form a star connection which corresponds to the U-phase, V-phase, W-phase illustrated in FIG. 6. At this time, when the core 2 is divided by a second compartment line 26 perpendicular or substantially perpendicular to the first compartment line 23 into a phase region and a neutral region equally along the axial direction, first coils 41a-46a of the first coil pair through the sixth coil pair 41-46 are arranged in the phase region 27, and the other coils 41b-46b are arranged in the neutral region 28. Accordingly, the conductive lines derived from the neutral region 28 can all be connected to a neutral point N.

As will be explained later, such arrangement makes it possible to simplify the wire connection between the stator 1 and the bus bar unit 30, and therefore provides excellent work efficiency. Further, it is also possible to miniaturize the bus bar unit 30 or the bus bar 32, and therefore reduce the expenses used in the materials.

Figure 7:
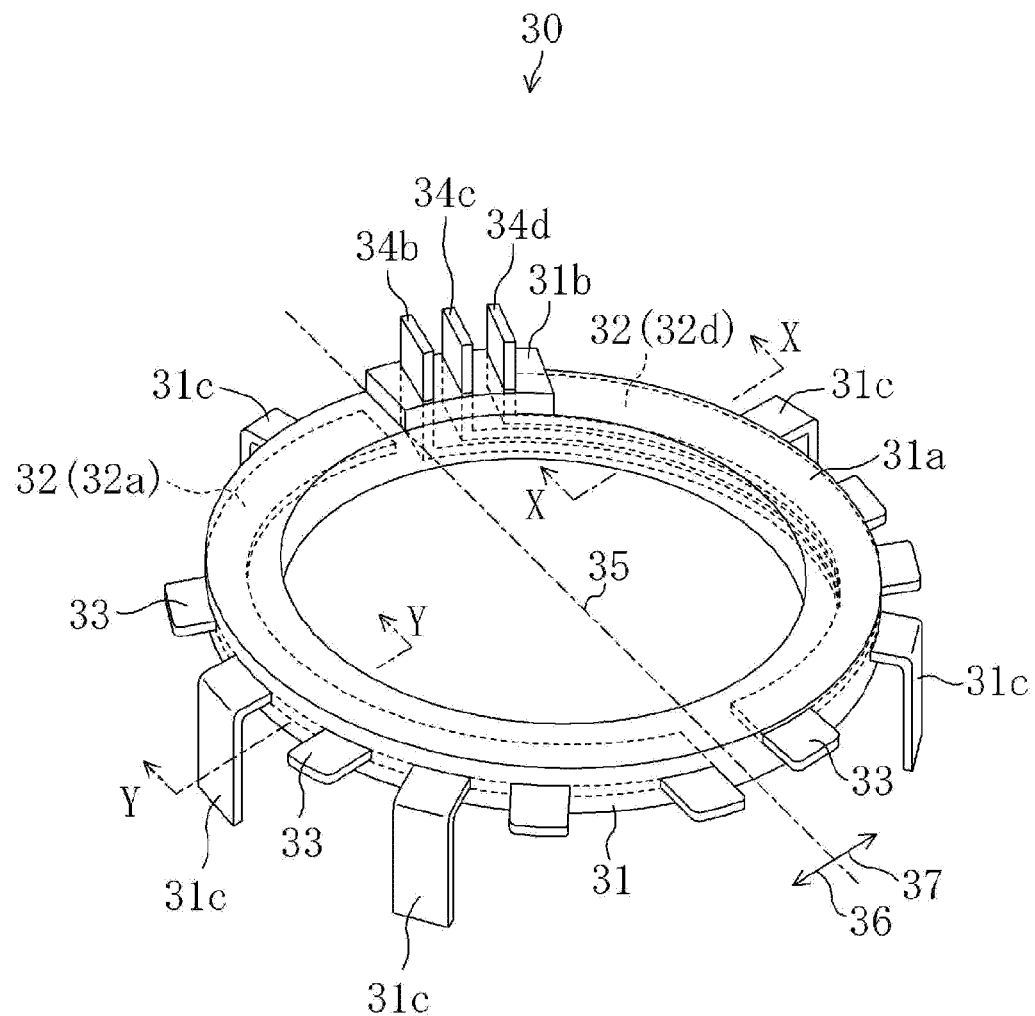
FIG. 7 is a schematic perspective view of a bus bar unit according to a preferred embodiment of the present invention.

As illustrated in FIG. 7, the bus bar unit 30 preferably includes of a plurality of bus bars 32 and a holder 31. The holder 31 preferably is an injection molded article preferably made of insulating resin such as, for example, polybutylenetelephthalate (PBT) including a fiber material. The holder 31 includes a bus bar supporting portion 31a in the shape of a ring, a connector portion 31b preferably provided as a single monolithic member together with the bus bar supporting portion 31a, and a plurality of supporting leg portions 31c arranged to be attached to the motor housing 5.

Figure 8:
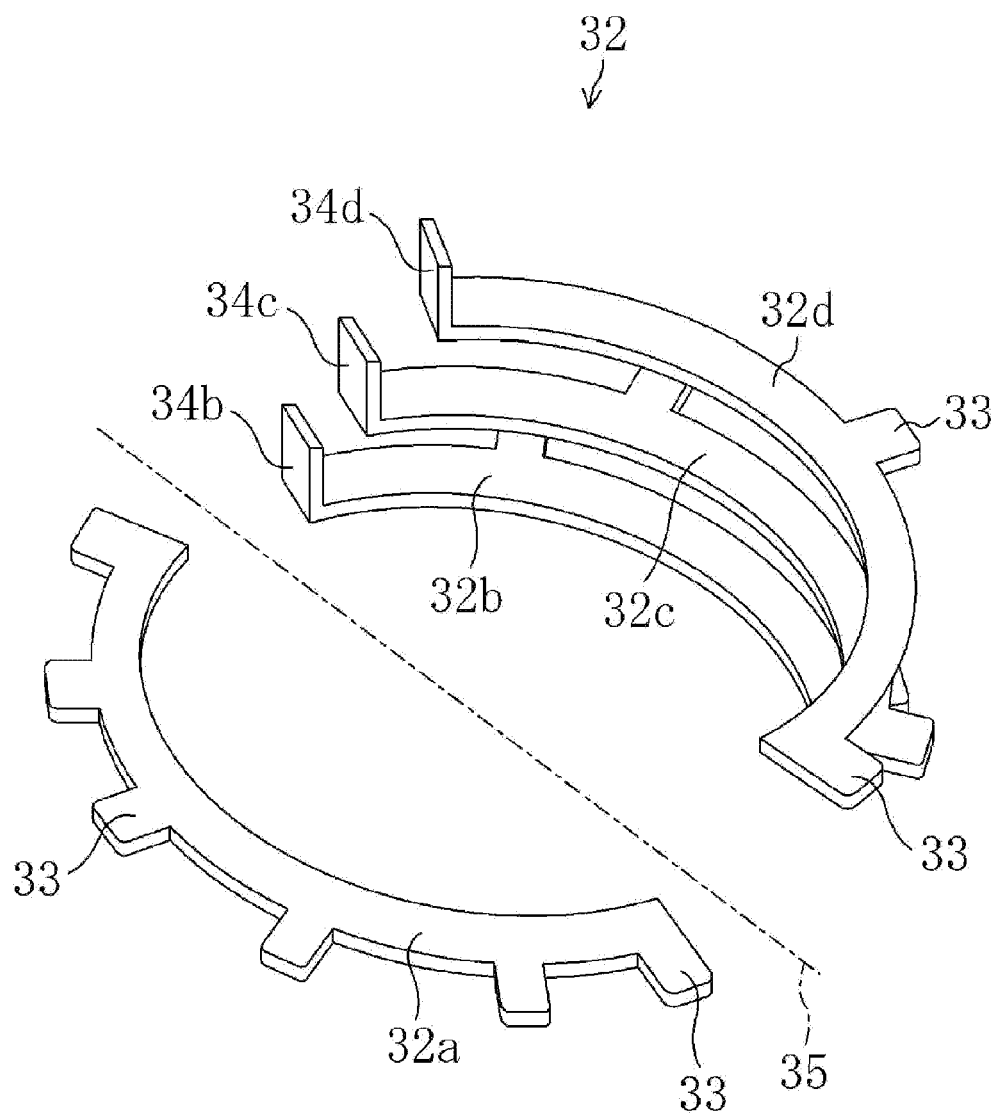
FIG. 8 is a schematic perspective view of a bus bar according to a preferred embodiment of the present invention.

The bus bar 32 is preferably a press processed metal plate with excellent conductivity, such as, for example, copper. Each bus bar 32 is preferably provided integrally with the holder 31 by, for example, insert molding. As illustrated in FIG. 8, the bus bar 32 of the present preferred embodiment is extended to the circumferential direction in a strip form and includes a first bus bar 32a in the approximate shape of a semicircle, and a second bus bar 32b, a third bus bar 32c, and a fourth bus bar 32d which is respectively in the shape of a minor arc having different lengths. A plurality of connecting terminals 33 is arranged to protrude from the outer circumference of each bus bar 32. The conductive line derived from the stator 1 is arranged to be connected to these connecting terminals 33. A second connector terminal 34b, a third connector terminal 34c, and a fourth connector terminal 34d which are standing perpendicularly or approximately perpendicularly with each other are integrally provided at the end of each of the second bus bar 32b, the third bus bar 32c, and the fourth bus bar 32d. The front end of the second connector terminal 34b, the third connector terminal 34c, and the fourth connector terminal 34d are arranged to protrude from the connector portion 31b of each holder 31.

Figure 9A:
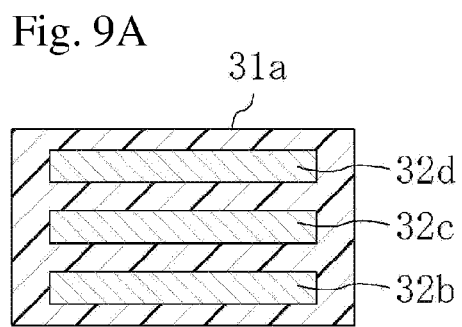
FIGS. 9A and 9B are portions of a sectional view of FIG. 7.
Figure 9B:
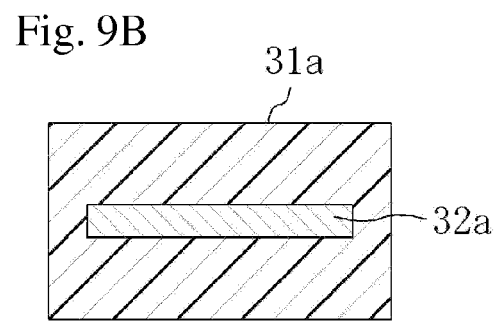

Each bus bar 32 is embedded in the bus bar supporting portion 31a so as to not contact with each other. Specifically, for example, when the bus bar supporting portion 31a is divided into a phase side region 37 and a neutral side region 36 by a bisectrix 35 equally along the axial direction, the first bus bar 32a is arranged in the neutral side region 36 and the second bus bar 32b, the third bus bar 32c, and the fourth bus bar 32d are arranged in the phase side region 37. As illustrated in FIG. 9A, in the phase side region 37, the second bus bar 32b, the third bus bar 32c, and the fourth bus bar 32d are arranged to overlap with each other with a resin layer therebetween. Meanwhile, as illustrated in FIG. 9B only the first bus bar 32a is arranged in the neutral side region 36.

Figure 10:
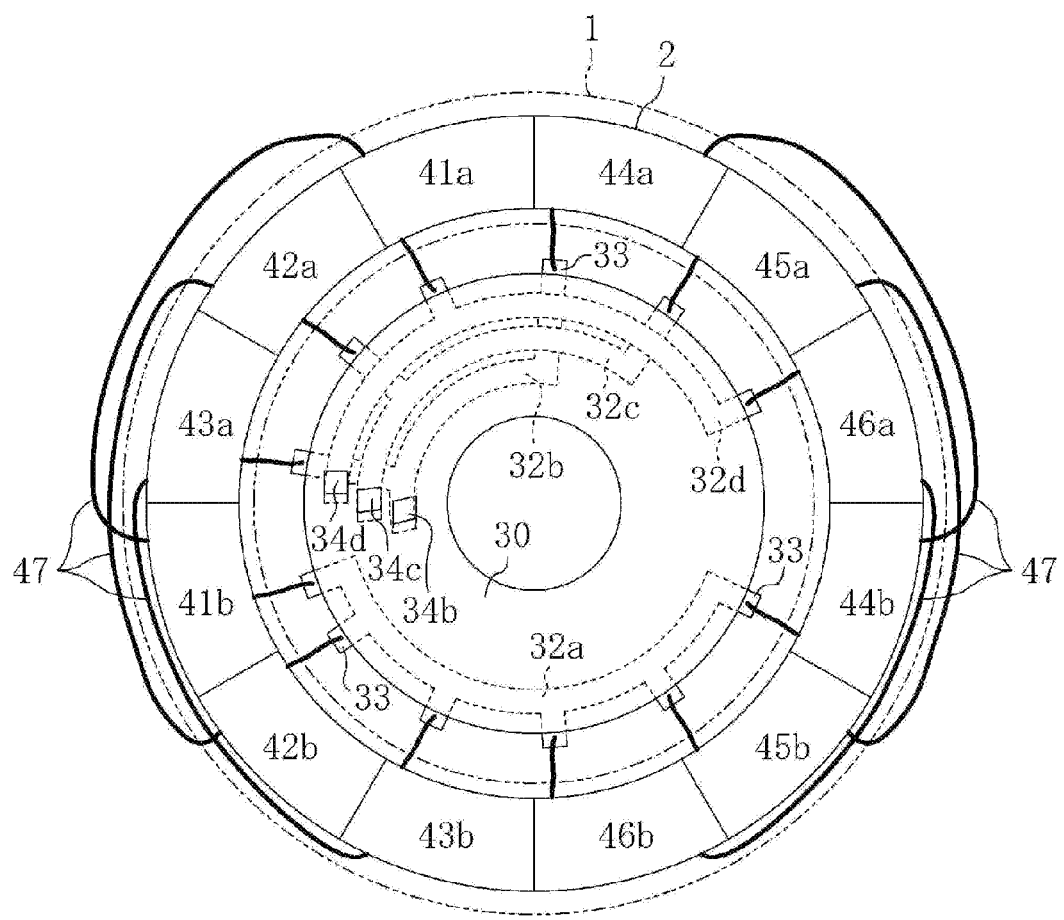
FIG. 10 is schematic diagram illustrating a wire connection between the stator and the bus bar.

As illustrated in FIG. 10, the bus bar unit 30 is connected to the stator 1. That is, the neutral side region 36 of the bus bar unit 30 is arranged correspondingly to the neutral region 28 of the stator 1, and the phase side region 37 of the bus bar unit 30 is arranged correspondingly to the phase region 27 of the stator 1. Further, the conductive line derived from the neutral region 28 of the stator 1, specifically, the conductive line derived from the coil 41b, the coil 42b, the coil 43b, the coil 44b, the coil 45b, the coil 46b is connected to each of the connecting terminals 33 of the first bus bar 32a.

The conductive line derived from the phase region 27 of the stator 1 is connected to certain connecting terminals 33 of the second bus bar 32b, the third bus bar 32c, and the fourth bus bar 32d. Specifically, the conductive lines of the coil 4a and the coil 44a are connected to each of the connecting terminals 33 of the second bus bar 32b. The conductive lines derived from the coil 42a and the coil 45a are connected to each of the connecting terminals 33 of the third bus bar 32c. The conductive lines of the coil 41a and the coil 46a are connected to each of the connecting terminals 33 of the fourth bus bar 32d. With such arrangements, a neutral point N is defined by the first bus bar 32a, and a star connection illustrated in FIG. 6 is defined by each of the contact points (U, V, W) which are provided by the second bus bar 32b, the third bus bar 32c, and the fourth bus bar 32d.

Figure 11:
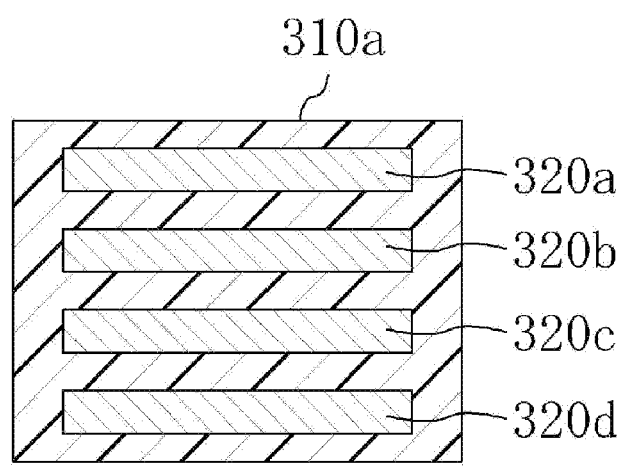
FIG. 11 is a portion of a sectional view of a conventional bus bar unit.

FIG. 11 illustrates an example of a conventional bus bar unit. When the conductive line connected to the neutral point is spread out widely around the circumference of the stator, it is common for the bus bar for the neutral point to have a ring or a major arc shape in order to prevent the conductive line from crawling about.

However, such arrangement makes the thickness of the bus bar supporting portion 310a thicker because the four bus bars 320a, 320b, 320c, 320d would be overlapped as shown in the bus bar unit illustrated in FIG. 11. Regarding such problems, the bus bar unit 30 of the present preferred embodiment provides the first bus bar 32a for the neutral point in the shape of an approximate semicircle, and the second bus bar 32b, the third bus bar 32c, and the fourth bus bar 32d for contact points of each phase in a form of a minor arc and arranges them respectively in the neutral side region 36 and the phase side region 37 of the bus bar unit 30, which makes it possible to decrease the axial thickness of the bus bar supporting portion and therefore enables the miniaturization of the bus bar unit 30. This also provides easy wire connection with the stator 1 and improves work efficiency.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A stator comprising:
   a ring portion;
   a core including a teeth portion which includes twelve teeth portions projecting from an inside of the ring portion toward a center thereof; and
   a coil group including twelve coils respectively provided in each one of the teeth portions; wherein
   the core includes twelve cores coupled to each other and each of which respectively includes one of the teeth portions;
   the coil group includes six coil pairs each including two of the twelve coils joined to each other by a conductive line; and
   when the core is divided into a phase region and a neutral region equally along an axial direction, one coil in each of the six coil pairs is arranged in the phase region, and the other coil in each of the six coil pairs is arranged in the neutral region.

2. The stator according to claim 1, wherein winding directions of the two coils in each of the six coil pairs are arranged in the same direction viewed from a front end side of the teeth portion;
   the six coil pairs include:
      a first coil pair, a second coil pair, and a third coil pair in which winding of each respective coil pair starts from a first coil of the coil pair and ends at a second coil of the coil pair; and
      a fourth coil pair, a fifth coil pair, and a sixth coil pair in which winding of each respective coil pair starts from the second coil and ends at the first coil;
   when the core is divided by a first compartment line equally along the axial direction into a first region and a second region, the first coil pair, the second coil pair, and the third coil pair are arranged in the first region, and the fourth coil pair, the fifth coil pair, and the sixth coil pair are arranged in the second region; and
   when the core is divided by a second compartment line perpendicular or substantially perpendicular to the first compartment line equally along the axial direction into the phase region and the neutral region, one coil in each of the first coil pair through the sixth coil pair is arranged in the phase region, and the other coil in each of the first coil pair through the sixth coil pair is arranged in the neutral region.

3. The stator according to claim 1, wherein
   each of the coil pairs are connected in a star connection; and
   all of the conductive lines derived from the neutral region are connected to a neutral point.

4. A motor comprising:
   the stator according to claim 1; and
   a bus bar unit including:
      a plurality of bus bars; and
      an insulating holder in which the plurality of bus bars are arranged; wherein the insulating holder includes a ring-shaped bus bar supporting portion;
   the plurality of bus bars include a first bus bar being in the shape of an approximate semicircle and at least one second bus bar, a third bus bar, and a fourth bus bar being in the shape of a minor arc; and when the bus bar supporting portion is viewed from the bus bar supporting portions axial direction and is divided into a phase side region and a neutral side region, the first bus bar is arranged in the neutral side region, and the at least one second bus bar, the third bus bar, and the fourth bus bar are arranged in the phase side region to overlap with each other.

5. The motor according to claim 4, wherein the first bus bar is arranged such that the star connection is connected to a neutral point.

6. The motor according to claim 5, further comprising a rotor including at least eight magnetic poles.

* * * * *